(12) United States Patent
Mori et al.

(10) Patent No.: US 7,599,358 B2
(45) Date of Patent: Oct. 6, 2009

(54) TELEPHONE SYSTEM, ITS LOG-IN MANAGEMENT METHOD AND SERVER DEVICE

(75) Inventors: Toshiki Mori, Kodaira (JP); Yoshiro Osaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 11/441,245

(22) Filed: May 26, 2006

(65) Prior Publication Data

US 2006/0268844 A1 Nov. 30, 2006

(30) Foreign Application Priority Data

May 27, 2005 (JP) ............... 2005-155830

(51) Int. Cl.
*H04L 12/66* (2006.01)

(52) U.S. Cl. ............... 370/352; 379/201.1; 379/211.02; 379/212.01; 379/93.02; 379/265.04

(58) Field of Classification Search ............ 370/352; 379/93.02, 211, 212, 214, 265.04, 201.1, 379/211.02, 212.01
See application file for complete search history.

(56) References Cited

U.S. PATENT DOCUMENTS

| | | | | |
|---|---|---|---|---|
| 6,041,114 | A * | 3/2000 | Chestnut | 379/211.02 |
| 6,792,266 | B1 * | 9/2004 | Masuda et al. | 455/417 |
| 2002/0071428 | A1 * | 6/2002 | Kitaguchi | 370/352 |
| 2003/0181209 | A1 * | 9/2003 | Forte | 455/445 |
| 2004/0032864 | A1 * | 2/2004 | Sbisa et al. | 370/360 |
| 2005/0010665 | A1 * | 1/2005 | Kuno | 709/224 |
| 2005/0117567 | A1 * | 6/2005 | Kimura | 370/352 |
| 2006/0013378 | A1 * | 1/2006 | Torii | 379/212.01 |
| 2006/0153171 | A1 * | 7/2006 | Sakai | 370/352 |

FOREIGN PATENT DOCUMENTS

| | | |
|---|---|---|
| EP | 1 229 708 A3 | 8/2002 |
| GB | 2 416 267 A | 1/2006 |
| JP | 2002-158771 | 5/2002 |
| JP | 2004-104489 A | 4/2004 |

OTHER PUBLICATIONS

Search Report from the British Patent Office dated Sep. 11, 2006.
Japanese Office Action from a Corresponding Application dated May 1, 2007.

* cited by examiner

*Primary Examiner*—Ahmad F Matar
*Assistant Examiner*—Antim Shah
(74) *Attorney, Agent, or Firm*—Finnegan, Henderson, Farabow, Garrett & Dunner, L.L.P.

(57) ABSTRACT

A telephone system, comprising telephone sets, exchange device and server device, wherein a telephone set has notification unit accepting log-in operation and server device includes user management table associating each telephone number of telephone sets with identification information of users, address management table dynamically associating each telephone number of users with address information, specification processor specifies telephone number of logged-in user when log-in operation is performed, verification processor verifies presence/absence of registration of specified telephone number, determination processor determines coincidence/discordance between address information and notified address information, and update processor updates address management table by overwriting address information, if the notified address information does not coincide with address information corresponding to registered telephone number.

10 Claims, 5 Drawing Sheets

| Telephone number | ID | PW |
|---|---|---|
| 100 | AAA | aaa |
| 101 | BBB | bbb |
| 102 | CCC | ccc |

| Telephone number | IP address |
|---|---|
| 100 | xxx.yyy.zzz.aaa |
| 101 | xxx.yyy.zzz.bbb |
| 102 | xxx.yyy.zzz.ccc |

TELEPHONE SYSTEM, ITS LOG-IN MANAGEMENT METHOD AND SERVER DEVICE

CROSS-REFERENCE TO RELATED APPLICATIONS

This application is based upon and claims the benefit of priority from prior Japanese Patent Application No. 2005-155830, filed May 27, 2005, the entire contents of which are incorporated herein by reference.

BACKGROUND OF THE INVENTION

1. Field of the Invention

The present invention relates to a telephone system used for an extension telephone system in an office, its log-in management method and a server device. More specifically, the invention relates to a telephone system for performing voice communications among terminals by using Internet Protocol (IP), its log-in management method and a server device.

2. Description of the Related Art

A system for communicating voice information via a best-effort communication network, such as the Internet, has been known. Such a system is referred to as an IP telephone system or Voice over IP (VoIP). This technology is also applied to a local communication network such as a private telephone network. Hereinafter, such a system is referred to as the IP telephone system, and a telephone set used for the system is referred to as an IP telephone set.

Even in a conventional telephone system, the multi-functionalization of the system has been advanced and a technique providing a fine service by combining a user's personal identification (ID) and a personal information database has been disclosed (for example, Jpn. Pat. Appln. KOKAI Publication No. 2002-158771). Especially, with use of a protocol referred to as Session Initiation Protocol (SIP), a further development of the IP telephone system has been expected.

Such an IP telephone system associates IP telephone sets with telephone numbers and IP addresses, respectively, to create a database and integrally manages the IP telephone sets by a server device such as an exchange server. Thereby, the IP telephone system has a procedure, in which when a user starts using the IP telephone set, the IP telephone set notifies and resisters user identification information (telephone number and ID, etc.) together with the IP addresses to and in the server device. Since the identification information has not been stored in the IP telephone set yet at the initial state thereof, the user inputs the user identification information manually. The registration processing at the first time is specifically referred to as log-in. In general, the IP telephone set performs re-registration processing periodically (for instance, once at every hour or once at every day) to update the registered information after completing log-in processing.

In the meantime, in the telephone system like this, the user can log in freely from any IP telephone set usually. In other words, even any IP telephone set placed anywhere, the telephone number of the user is assigned to the IP telephone set when the user logs in thereby and the user can use the IP telephone set as their own. When the user moves their location, the user logs out from the IP telephone set which has been used by itself and logs in the system from the IP telephone set positioned at the moving destination after deleting the registered information thereform.

However, if the user moved while forgetting to log out from the telephone system, incoming calls to the user are subjected to connect with the IP telephone positioned at the former place, and it causes an inconvenience particularly in a place of a highly public nature, such as an office. To delete the registered information from the telephone system, the user has to return to the former place to log out therefrom and feels it as a nuisance depending on circumstances.

BRIEF SUMMARY OF THE INVENTION

According to an aspect of the present invention, there is provided a telephone system, comprising a plurality of telephone sets to which address information in a packet communication network is uniquely added, an exchange device which controls incoming calls to the plurality of telephone sets on the basis of the address information and a server device connected to the packet communication network, wherein each of the plurality of telephone sets has a notification unit accepting a log-in operation based on identification information of users to notify the identification information and address information of its own telephone set, and the server device includes: a user management table which is formed as a table by associating each telephone number of the plurality of telephone sets with the identification information of the users; an address management table which is formed as a table by dynamically associating each telephone number of the users with address information of the corresponding telephone sets; a specification processing unit which specifies a telephone number of a logged-in user by referring to the user management table on the basis of the identification information when the log-in operation is performed; a verification processing unit which verifies a presence/absence of a registration of the specified telephone number by referring to the address management table on the basis of the specified telephone number; a determination processing unit which determines a coincidence/discordance between the address information corresponding to the registered specified telephone number and the notified address information by referring to the address management table, if the specified telephone number has already been registered; and an update processing unit which updates the address management table by overwriting address information corresponding to the registered telephone number in the address management table by the notified address information, if the notified address information does not coincide with the address information corresponding to the registered telephone number.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
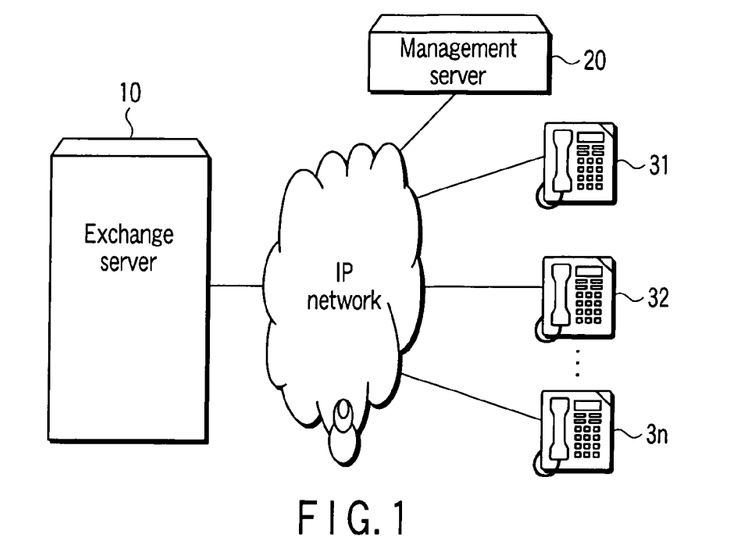
FIG. 1 is an exemplary system view showing an embodiment of a telephone system regarding the present invention.

FIG. 1 is the system view showing the embodiment of the telephone system regarding the present invention. In FIG. 1, all of a plurality of IP telephone sets 31-3n are connected to an IP network. The IP network also connects an exchange server 10 and a management server 20 therewith and forms a so-called VoIP system. The exchange server 10 controls exchange operations of communication calls. If the IP network is a local area network (LAN), a system in FIG. 1 is realized as a private extension telephone system.

Figure 2:
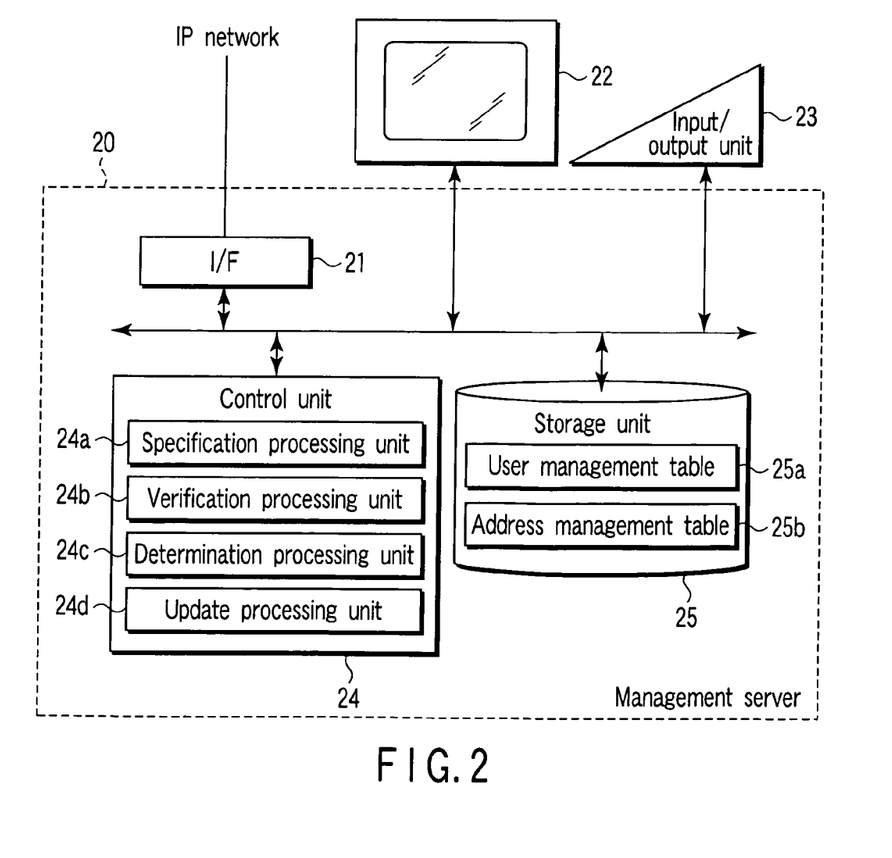
FIG. 2 is an exemplary functional block diagram of a management server 20 in FIG. 1.

FIG. 2 is the functional block diagram of the management server 20 in FIG. 1. In FIG. 2, the management server 20 includes an interface unit 21, a display unit 22, an input/output unit 23, a control unit 24 and a storage unit 25. The interface unit 21 is connected to the IP network. The storage unit 25 stores the user management table 25a and the address management table 25b in dedicated storage areas, respectively.

Figure 3:
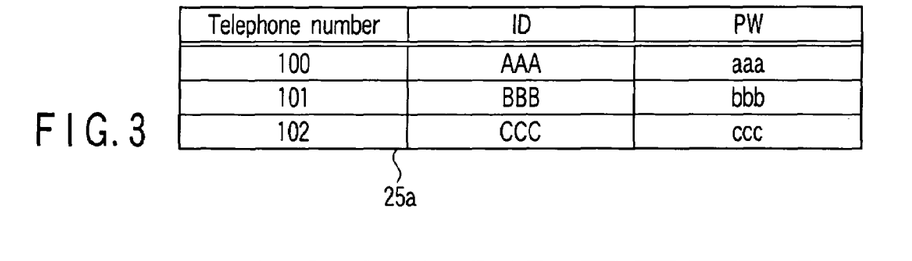
FIG. 3 is an exemplary view showing a user management table 25a in FIG. 2.

FIG. 3 is the view showing the user management table 25a in FIG. 2. The management table 25a is one to manage telephone numbers and information to identify individual telephone users. The management table 25a is composed of extension telephone numbers, personal IDs of users who use the IP telephone sets, passwords (PWs), etc. In FIG. 3, a telephone number 100 is assigned to a user of ID=AAA and PW=aaa and a telephone number 101 is assigned to a user of ID=BBB and PW=bbb.

Figure 4:
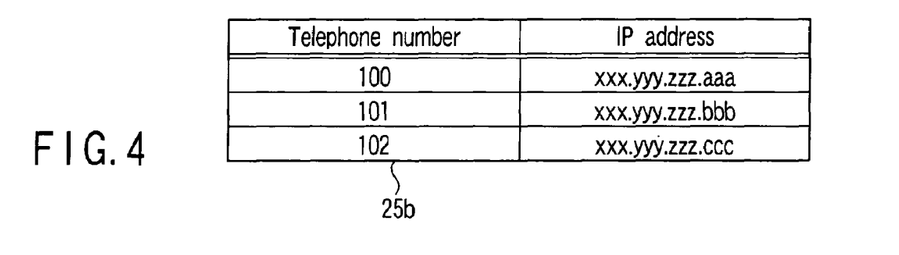
FIG. 4 is an exemplary view showing an address management table 25b in FIG. 2.

FIG. 4 is the view showing the address management table 25b. The management table 25b is one to manage the association between telephone numbers and IP addresses of each IP telephone set to which the telephone numbers are assigned, respectively. FIG. 4 shows the state in which the telephone number 100 is assigned to the IP telephone set having an IP address xxx, yyy, zzz, aaa and the telephone number 101 is assigned to the IP telephone set having an IP address xxx, yyy, zzz, bbb.

The user of the IP telephone set inputs user identification information (ID, PW) by means of the IP telephone at the start of work, etc., in every morning. This procedure is referred to as a log-in operation, and the user can use the logged in IP telephone set as the IP telephone set intended specifically for its use.

In FIG. 2, the control unit 24 includes, as processing functions regarding the invention, a specification processing unit 24a, a verification processing unit 24b, a determination processing unit 24c and an update processing unit 24d. When the log-in procedure is performed, the specification processing unit 24a refers to the management table 25a on the basis of the user ID/PW notified from the IP telephone set to specify the telephone number of the logged in user. The verification processing unit 24b refers to the management table 25b on the basis of the specified telephone number to verify the presence or absence of registration of the specified telephone number. If the specified telephone number has already been registered, the determination processing unit 24c refers to the management table 25b to determine coincidence/discordance between the IP address corresponding to the registered telephone number and the IP address included in the notification from the IP telephone set of a log-in origin. If the notified IP address does not coincide with the IP address corresponding to the registered telephone number, the update processing unit 24d overwrites the IP address corresponding to the registered telephone number in the management table 25b by the notified IP address. The management table 25b thereby always records the IP address based on the latest log-in procedure.

Figure 5:
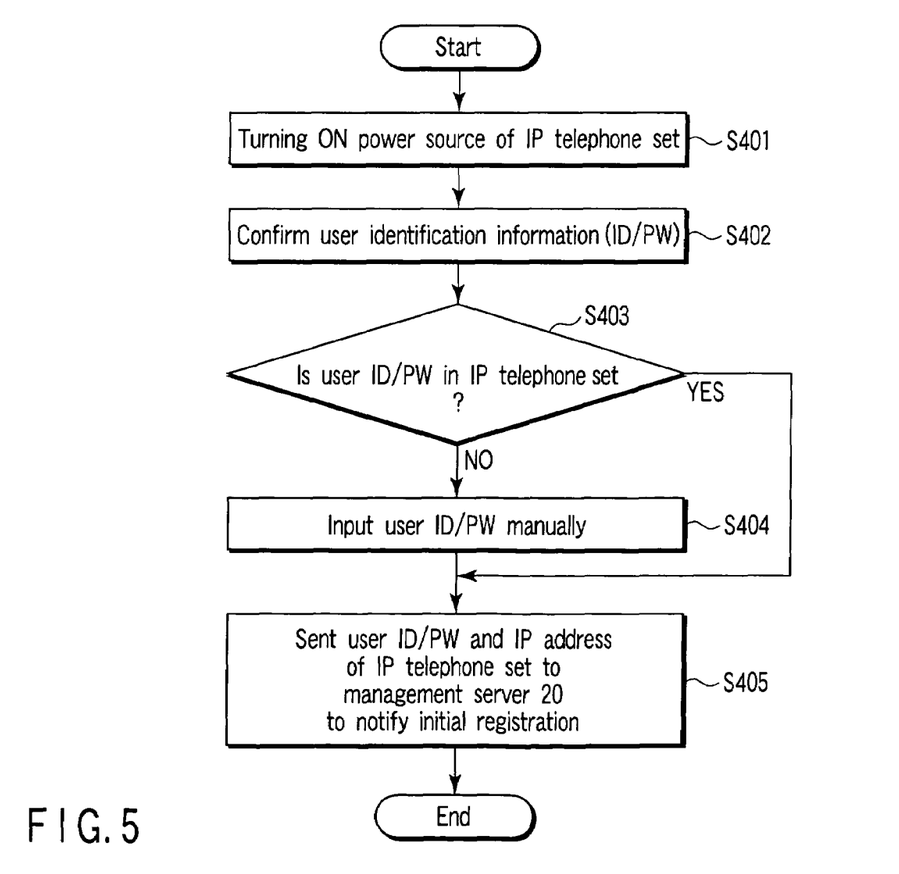
FIG. 5 is an exemplary flowchart showing a log-in processing procedure of IP telephone sets 31-3n in FIG. 1.

FIG. 5 is the flowchart showing the log-in processing procedure of the IP telephone sets 31-3n in FIG. 1. In FIG. 5, when a power source is turned on (step S401), the IP telephone set 31 checks whether the user ID/PW is stored or not in its own memory (step S402). If the user ID/PW is stored (YES in step S403), the IP telephone set 31 notifies the ID/PW and the IP address assigned to the IP telephone set 31 in advance to the management server 20 (step S405). With receiving this notification, the management server 20 notifies the telephone number corresponding to the notified ID/PW. After this, the IP telephone set 31 operates in accordance with the notified telephone number.

If the ID/PW is not stored (No, in step S403), the user manually inputs the ID/PW through dial buttons, etc (step S404). The IP telephone set 31 then notifies the ID/PW and the IP address assigned to itself in advance to the management server 20 (step S405). On receiving this notification, the management server 20 notifies the telephone number corresponding to the ID/PW to the IP telephone set 31. After this, the IP telephone set 31 operates depending on the notified telephone number. Therefore, the user can use any IP telephone set by assigning a telephone number of an individual user.

Figure 6:
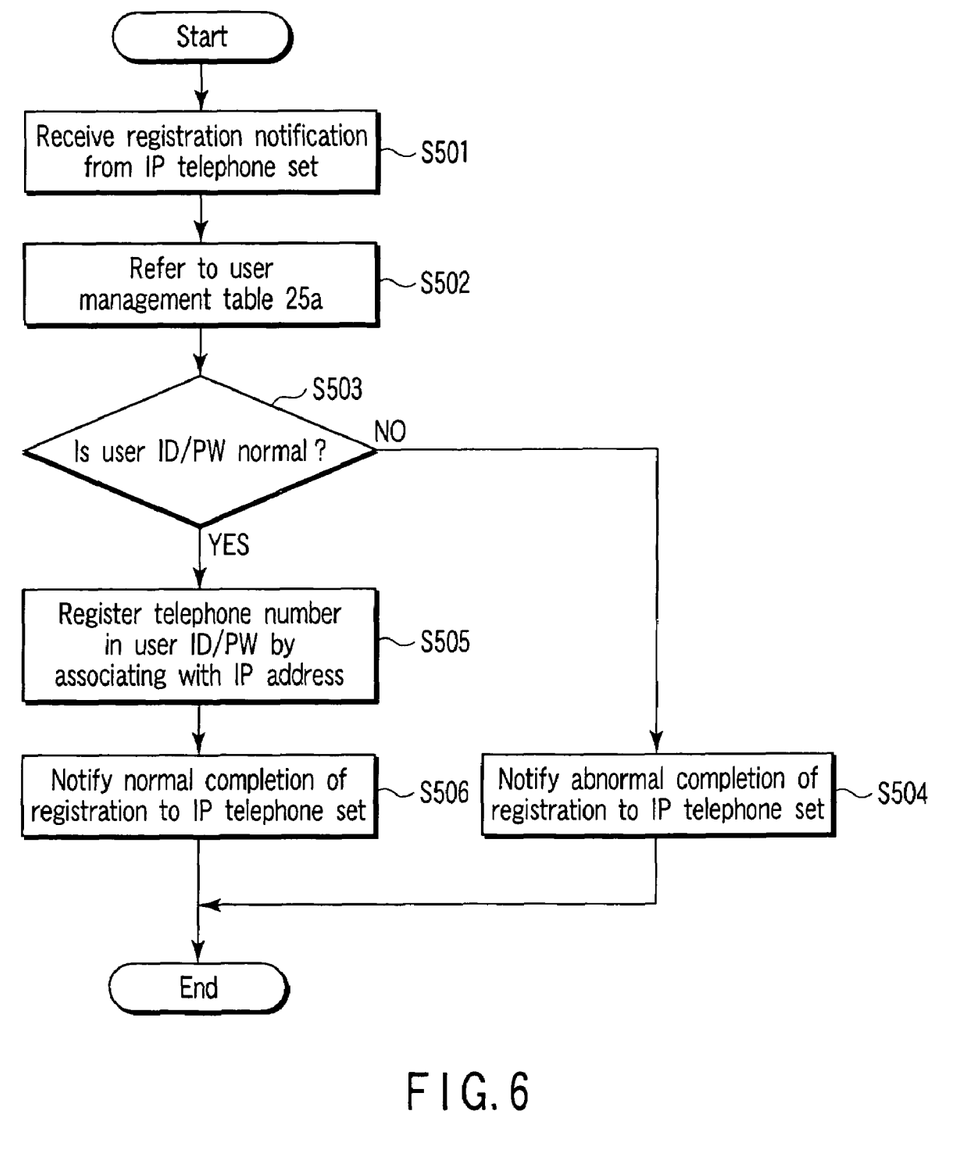
FIG. 6 is an exemplary flowchart showing a processing procedure of the management server 20 in log-in processing of the IP telephone sets 31-3n.

FIG. 6 is the flowchart showing the processing procedure of the management server 20 in the log-in processing of the IP telephone set. In FIG. 6, when receiving the notification of the registration information including the ID/PW and the IP address (step S501), the management server 20 refers to the user management table 25a (step S502). The management server 20 next recognizes normality of the notified ID/PW on the basis of the reference result (step S503). If the ID/PW is not correct (NO, in step S503) the management server 20 notifies the fact that the registration has not completed normally (NG completion) to the IP telephone set of a notification origin (step S504).

If the user ID/PW is correct (YES, in step S503), the management server 20 registers the user ID/PW to the address management table 25b by associating the telephone number and the notified IP address with each other (step S505) and notifies the normal completion of the registration to the IP telephone set of a notification origin (step S506). Thereby, the IP telephone set which has sent the registration notification becomes available.

For example, it is presumed that the IP telephone set with the IP address of xxx, yyy, zzz, ccc notifies the user ID/PW of ID/PW=CCC/ccc. In this case, the management server 20 can specify that the telephone number of the logged in user is 102 by referring to the user management table 25a in FIG. 3. Then log-in has completed by registering the IP address of the telephone number 102 as xxx, yyy, zzz, ccc to the address management table 25b, and after this, the user can use the IP telephone set as an IP telephone set of the telephone number 102.

After the log-in operation of the first time (initial registration) has completed normally, the IP telephone set repeats automatic registration operations periodically by a time period such as once an hour or once a day during its power source is turned on. Thereby, the management server 20 can recognize that the IP telephone has been used continuously after the completion of the log-in operation. In the address management table 25b, if an IP telephone set has not finished the first registration processing yet, a column of an IP address for such an IP telephone becomes blank.

By the way, log-in operations though the same user ID/PW by a plurality of IP telephone sets result in assignments of one telephone number to every telephone set. If the telephone system (or the operation policy of the telephone system) allows this multiple assignments, no problem is caused; however if the telephone system does not allow them, the telephone system has to perform a procedure (log-out procedure) to delete the registration of a previous IP telephone set before a registration operation for another IP telephone set. Next, a processing procedure to eliminate the log-out procedure for the previous IP telephone set will be described.

Figure 7:
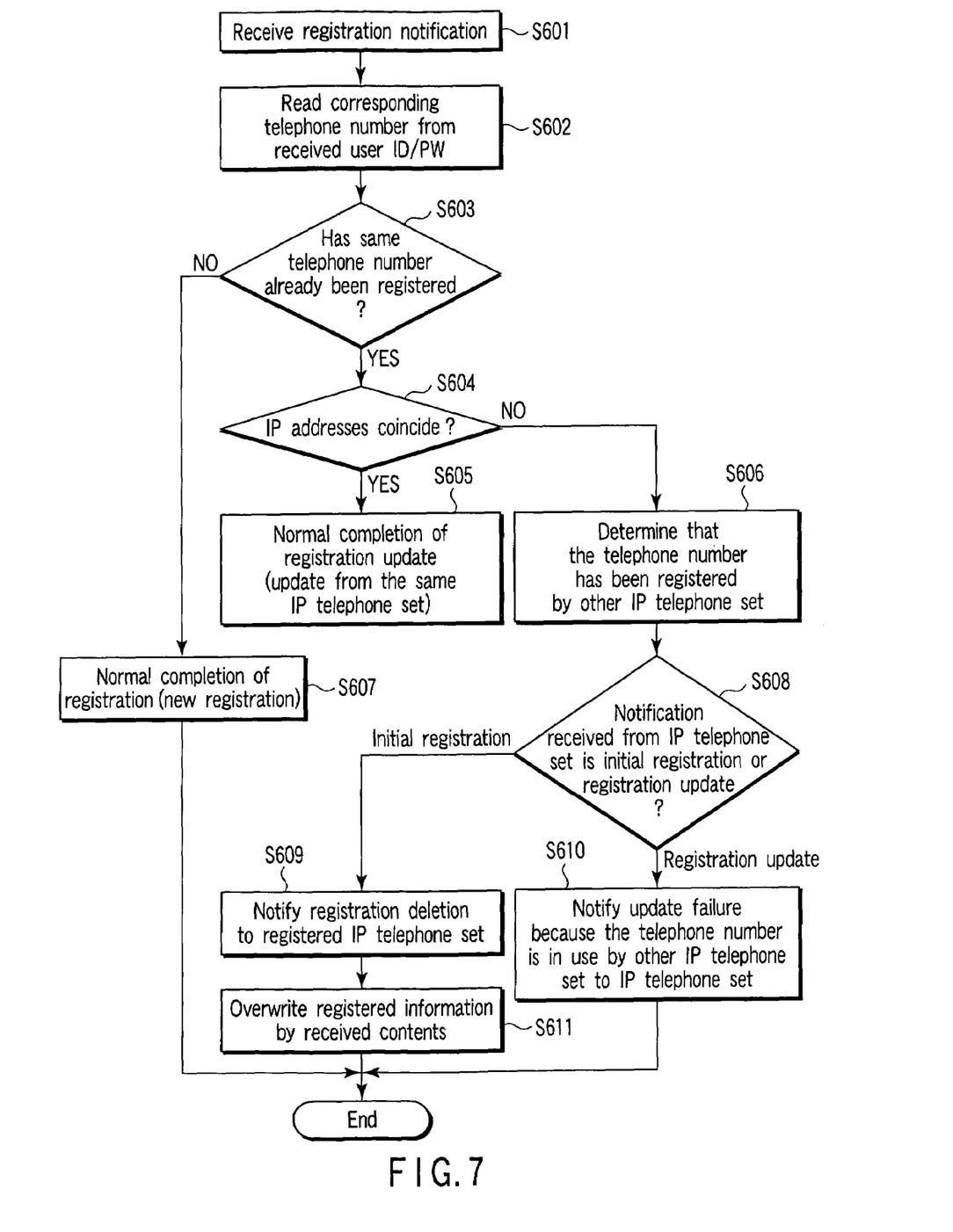
FIG. 7 is an exemplary flowchart showing a processing procedure of the management server 20 when a plurality of IP telephone sets performed registration operations with the same user identification information (ID/PW)

FIG. 7 is the flowchart showing the processing procedure of the management server 20 when the plurality of IP telephone sets performed registration operations with the same user ID/PW. In FIG. 7, when receiving the registration notification from the IP telephone set (step S601), the management server 20 retrieves the telephone number from the user management table 25a on the basis of the notified user ID/PW to read out the corresponding telephone number (step S602).

Subsequently, the management server 20 determines whether or not the read telephone number has already been registered in the address management table 25b (step S603). If the telephone number has not been registered (NO, in S603), the management server 20 newly registers the telephone number and the corresponding IP address as new log-in processing to complete a normal registration (S607). If the same telephone number has already been registered (YES, in S603), the management server 20 confirms whether or not IP addresses also coincides with each other (step S604). If the registered IP addresses are the same ones (YES, in S604), since the management server 20 can determine that the registration update requests have issued from the same IP telephone set, there is no need to rewrite the registration information and the update processing of the registration completes normally (step S605).

If the IP addresses do not coincide with each other (NO, in step S604), the management server 20 can determine that the registration requests have issued from different IP telephone sets (step S606). In this case, the management server 20 further distinguishes whether the update requests are initial registration requests (at the time of turning on of the power source, etc.) or periodical registration update requests (step S608). If they are the requests for the initial registration, the management server 20 notifies the fact of deletion of the registration to the already registered IP telephone set (step S609) and also overwrites new registration information onto the address management table 25b (step S611). Thereby, a new IP telephone set becomes available. If they are the requests for the registration update, the management server 20 replies the fact that the registration update is impossible because the requested telephone numbers have already been registered by other IP telephone sets, to the IP telephone sets of the request origins (step S610) and does not update the address management table 25b.

With such procedures, as to the first time log-in operations, the log-in operations which have been performed later are preferentially registered, except the periodical automatic registration update requests. Accordingly, without having to perform registration deletion processing of the previous IP telephone sets, the IP telephone sets which have requested their registration become available only by notifying the new registration information from other IP telephone sets located at other places. That is to say, if the user who has forgotten the log-out procedure performs the next log-in procedure, the latest log-in procedure is preferentially processed then the previous log-in is forced to be sifted to a log-out situation. Therefore, the user who has forgotten the log-out procedure has no need to return to the place before moving then the telephone system becomes possible to improve its convenience.

In such a manner, in this embodiment, when log-in is requested, the telephone system reads out the telephone number of the logged in user from the user ID/PW included in the registration notification. And if the same telephone number has already been registered in the address management table 25b, the telephone system confirms the coincidence/discordance of the IP addresses by the management server 20. If the telephone numbers coincide but the IP addresses do not coincide with each other, the management server 20 determines whether the log-in operation is for the initial registration or for the registration update. If it is one for the initial registration, the management server 20 determines that the log-in operation has been performed from another IP telephone set belonging to the same user to overwrite the contents of the address management table 25b in accordance with the new registration information. Thereby, if the same user performs the log-in operations from different IP telephone sets, the later log-in operation is preferentially treated and the registered information by the former log-in operations is deleted. Consequently, it becomes not necessary for the user who has forgotten the log-out operation to return to the place before moving.

The present invention is not limited to the above-described embodiment. For instance, although the aforementioned embodiment is configured that the management server 20 checks the presence/absence of the registration of the plurality of IP telephone sets, the IP telephone sets may have such checking functions as substitute for that configuration.

Figure 8:
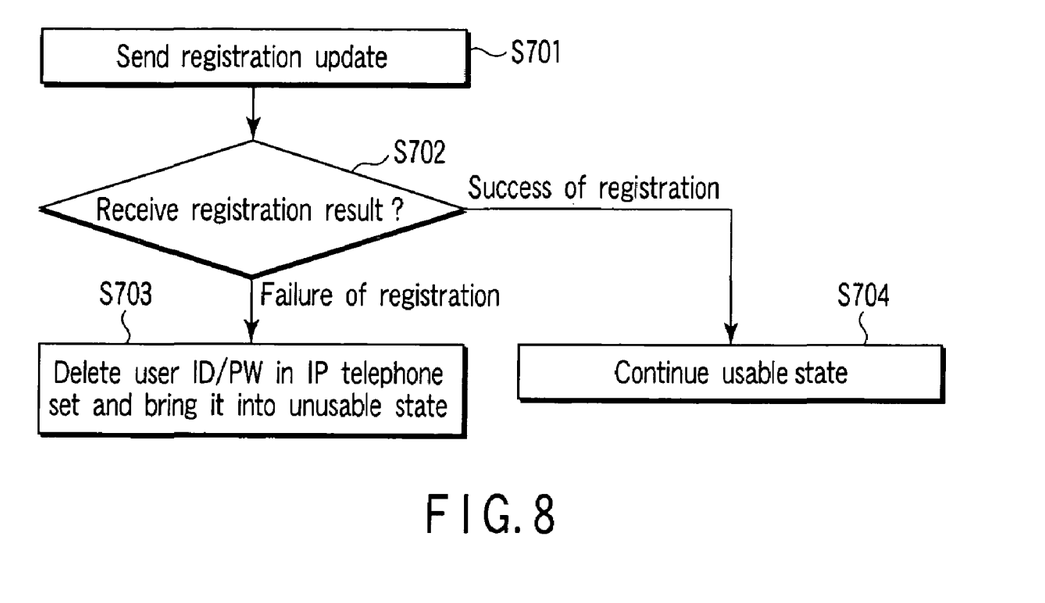
FIG. 8 is an exemplary flowchart showing a processing procedure of an IP telephone set for checking the presence or absence of overlapped registration.

FIG. 8 is the flowchart showing the processing procedure of the IP telephone set for checking the presence or absence of the overlapped registration. In FIG. 8, when notifying the registration information accompanying the log-in operation, the IP telephone set reads out current registered information from the management server 20, and if there is no registered information other than that of its own IP telephone set, the IP telephone set continues the registration operation (step S704). And if there is registered information of any IP telephone set other than its own telephone set and also its own telephone set has intended to request for its first registration, the IP telephone set continues the registration operation and also intends to delete the registered information of other users. Since the user ID/PW for the telephone number has already been known, that processing is possible to be achieved. Furthermore, if there is the registered information of the IP telephone sets other than its own telephone set and its own telephone set also intends to update its registered information, the IP telephone set pauses for the registration operation to bring the IP telephone set into an unregistered state and into a state in which the OP telephone set itself is restricted to be used (step S703). This processing procedure can be adapted to the case where the user does not desire multiple registrations of the IP telephone sets because of problems on a system operation although the management server 20 allows the multiple registrations.

In FIG. 5, if the user ID/PW has been stored in the IP telephone set, the telephone system can jump step S404 to eliminate the ID/PW input operation by the user. As a substitution for this, the telephone system may be configured to delete the user ID/PW in the IP telephone set simultaneously turning off the power source and prompt the user to perform the ID/PW input operation for each time when the IP telephone set is activated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A telephone system, comprising a plurality of telephone sets having unique address information on a packet communication network, an exchange device which controls incoming calls to the plurality of telephone sets on the basis of the address information and a server device connected to the packet communication network, wherein
    each of the plurality of telephone sets comprises a notification unit that accepts a user log-in operation based on identification information of users and notifies the identification information of users and address information of its own telephone set to the server device in a registration request, and
    the server device includes:
        a user management table associating each telephone number of the plurality of telephone sets with the identification information of the users;
        an address management table dynamically associating each telephone number of the users with address information of the corresponding telephone sets;
        a specification processing unit which specifies a telephone number of a logged-in user by referring to the user management table on the basis of the identification information when the log-in operation is performed;
        a verification processing unit which verifies whether the specified telephone number is registered by referring to the address management table on the basis of the specified telephone number;
        a determination processing unit which determines whether the address information of the registered specified telephone number and the notified address information are the same by referring to the address management table, if the specified telephone number has already been registered; and
        an update processing unit which updates the address management table by overwriting address information of the registered telephone number in the address management table with the notified address information, if it is determined that the notified address information is not the same as the address information of the registered telephone number,
        wherein the server device notifies the registered telephone that it has been deregistered when is determined that the notified address information is not the same as the address information of the registered telephone number and that the registration request is an initial registration request.

2. The telephone system according to claim 1, wherein the verification processing unit notifies the telephone of the logged-in user that the specified telephone number has already been registered, if the specified telephone number has already been registered.

3. The telephone system according to claim 1, wherein each of the plurality of telephone sets stores user identification information input in the log-in operation to perform log-in processing to the server device periodically on the basis of the stored identification information.

4. The telephone system according to claim 3, wherein each of the plurality of telephone sets deletes the stored identification information in response to instructions from the server device.

5. A log-in management method for a telephone system, comprising a plurality of telephone sets having unique address information on a packet communication network, an exchange device which controls incoming calls to the plurality of telephone sets on the basis of the address information and a server device connected to the packet communication network, the method comprising:
    accepting, by each of the plurality of telephone sets, a user log-in operation based on user identification information;
    notifying, by each of the plurality of telephone sets, the identification information of users and address information of its own telephone set to the server device, in a registration request;
    storing, by the server device, a user management table associating each telephone number of the plurality of telephone sets with the user identification information;
    storing, by the server device, an address management table dynamically associating each telephone number of the users with address information of the corresponding telephone sets;
    specifying, by the server device, a telephone number of a logged-in user by referring to the user management table on the basis of the identification information in response to the log-in operation;
    verifying, by the server device, whether the specified telephone number is registered by referring to the address management table on the basis of the specified telephone number;
    determining, by the server device, whether address information of the registered telephone number and the notified address information are the same by referring to the address management table, if the specified telephone number is registered;
    updating, by the server device, the address management table by overwriting address information of the registered telephone number on the address management table with the notified address information, if it is determined that the notified address information is not the same as the address information of the registered telephone number; and
    notifying, by the server device, the registered telephone that it has been deregistered when it is determined that the notified address information is not the same as the address information of the registered telephone number and that the registration request is an initial registration request.

6. The log-in management method according to claim 5, wherein the server device notifies the telephone of the logged-in user that the specified telephone number has already been registered to a telephone set of a log-in origin, if the specified telephone number has already been registered.

7. The log-in management method according to claim 5, wherein each of the plurality of telephone sets stores user identification information input by the log-in operation to periodically perform log-in processing to the server device on the basis of the stored identification information.

8. The log-in management method according to claim 7, wherein each of the plurality of telephone sets deletes the stored identification information in response to instructions from the server device.

9. A server device, including a plurality of telephone sets having unique address information on a packet communication network, and an exchange device which controls incoming calls to the plurality of telephone sets on the basis of the address information, comprising:

a user management table associating each telephone number of the plurality of telephone sets with identification information of users;

an address management table dynamically associating each telephone number of the users with address information of the corresponding telephone sets;

a specification processing unit which specifies a telephone number of a logged-in user by referring to the user management table on the basis of the identification information when the log-in operation is performed;

a verification processing unit which verifies whether the specified telephone number is registered by referring to the address management table on the basis of the specified telephone number;

a determination processing unit which determines whether the address information of the registered telephone number and notified address information received in a registration request from a telephone set to which the user is logged in are the same by referring to the address management table, if the specified telephone number has already been registered; and an update processing unit which updates the address management table by overwriting address information of the registered telephone number in the address management table by the notified address information, if it is determined that the notified address information is not the same as the address information of the registered telephone number, wherein the server device notifies the registered telephone that it has been deregistered when it is determined that the notified address information is not the same as the address information of the registered telephone number and that the registration request is an initial registration request.

10. The server device according to claim 9, wherein the verification processing device notifies the telephone of the logged-in user that the specified telephone number has already been registered if the specified telephone number has already been registered.

* * * * *

UNITED STATES PATENT AND TRADEMARK OFFICE
CERTIFICATE OF CORRECTION

| | | |
|---|---|---|
| PATENT NO. | : 7,599,358 B2 | Page 1 of 1 |
| APPLICATION NO. | : 11/441245 | |
| DATED | : October 6, 2009 | |
| INVENTOR(S) | : Mori et al. | |

It is certified that error appears in the above-identified patent and that said Letters Patent is hereby corrected as shown below:

Claim 1, column 7, line 49, delete "specified".

Claim 1, column 7, line 61, change "when is" to --when it is--.

Claim 2, column 8, line 2, change "registered," to --registered--.

Claim 5, column 8, line 25, change "device," to --device--.

Signed and Sealed this

Eighth Day of December, 2009

David J. Kappos
*Director of the United States Patent and Trademark Office*